Dec. 11, 1934.  E. W. MILLER  1,984,194
GEAR FINISHING GENERATING MACHINE
Filed Sept. 21, 1928   6 Sheets-Sheet 1

Inventor:
Edward W. Miller

Patented Dec. 11, 1934                                              1,984,194

UNITED STATES PATENT OFFICE 1,984,194

GEAR FINISHING GENERATING MACHINE

Edward W. Miller, Springfield, Vt., assignor to
The Fellows Gear Shaper Company, Springfield,
Vt., a corporation of Vermont Application September 21, 1928, Serial No. 307,383

9 Claims. (Cl. 125—11)

This invention relates to machines for finishing with a generating action gears and similar articles having involute tooth curves, which have previously been cut to approximately correct dimensions but have a surplus of stock left for removal in the finishing operation. Such machine is intended and applicable to finish both straight and helical spur gears, and gear shaper cutters of the Fellows type for either straight or helical gears, the latter being included in the class of "similar articles" above mentioned. Its object is to furnish a machine of the character above indicated by which the work may be cut to final finished form and dimensions with great accuracy and precision, not only as to the face curves of individual teeth but also to the pitch or spacing between adjacent teeth, and to do so rapidly by elimination of the need of indexing the work after completion of each tooth and by causing the tool and work to travel continuously without change of direction or speed. A further object is to combine with these characteristics adjusting means for accommodating the machine to work pieces of different diameters, for regulating and determining the depth of cut, for correcting the pressure angle of the generated tooth forms, and for positioning the tool relatively to the work so that, when cutting flanks of teeth within the base circle of the face curves, such flanks may be made either radial or full or undercut. The principles and particulars in which the invention consists may best be stated in connection with the following detailed description of a concrete machine embodying such particulars and by reference to the drawings.

Fig. 1 of the drawings shows a front elevation of the machine hereinafter described;

Fig. 3 is a rear elevation of the machine;

Like reference characters designate the same parts wherever they occur in all the figures.

As indicated in the introductory part of this specification, the machine is primarily intended to act upon gears and similar articles which have already been cut to nearly finished dimensions, removing only a small amount of stock in doing so, but correcting in the process errors which may have been left by the last previous operation. It is believed that with the correct use of this machine results are obtainable exceeding in accuracy the results obtainable by any previously known means. The principle on which the machine operates to accomplish this object is that of base line rotation of the work and traverse of the cutting element, and the provision in the cutting tool of a plurality of continuous helical cutting elements which, in axial section, correspond to the teeth of a rack having tooth faces perpendicular to the pitch line and accurately spaced with a linear pitch equal to the circumferential pitch on the base line of the teeth in the work. The foregoing general statement may be illustrated and explained by reference to Figs. 18 and 19 on Sheet 2.

Figures 2, 18, 19:
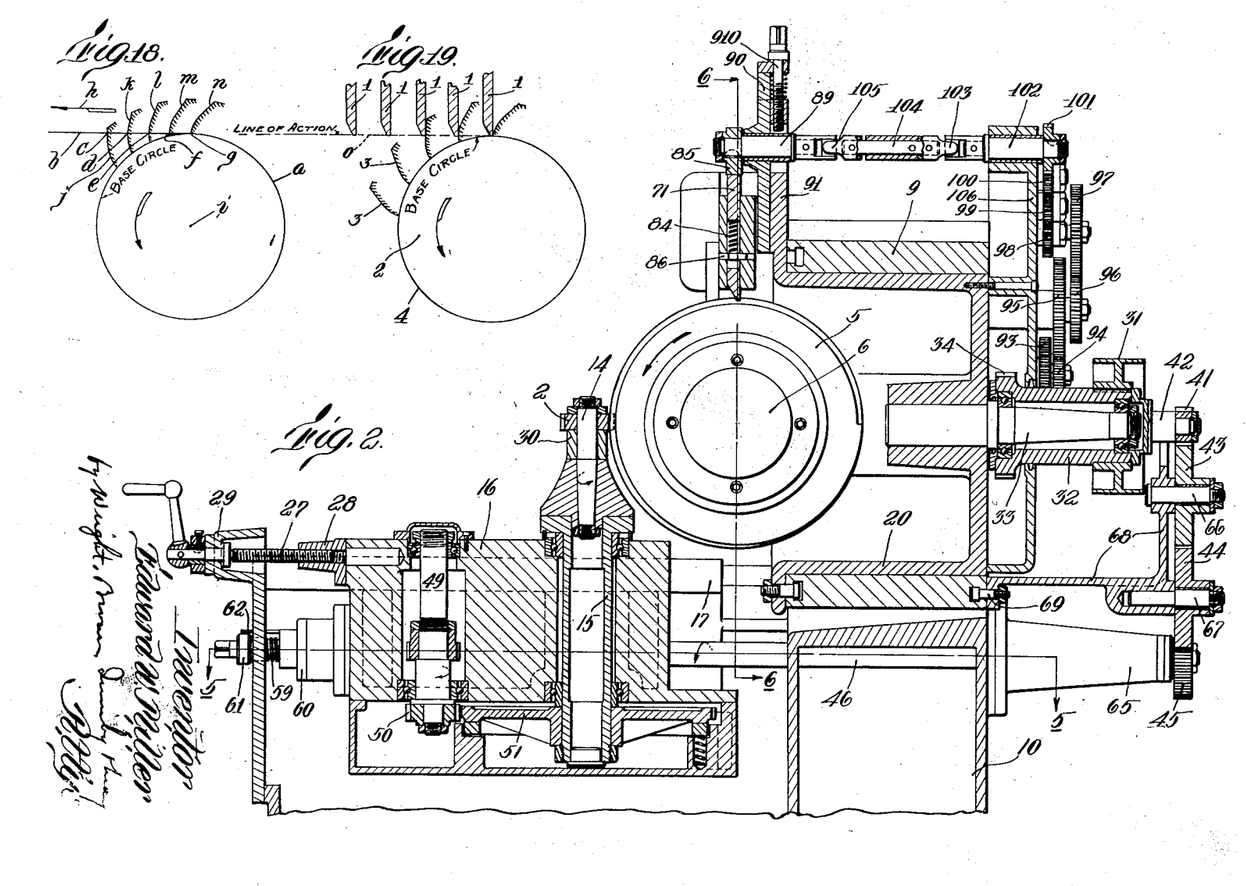
Fig. 2 shows a longitudinal vertical section on line 2—2 of Fig. 1.
Figures 18 and 19 are diagrammatic views illustrating the principle used in the generation of involute teeth in my invention.

Let it be assumed that the circle $a$ shown in Fig. 18 represents a drum or cylinder attached to a card or plate on which a line may be marked, and that $b$ represents a cord wrapped about the drum and carrying scribing points $c$, $d$, $e$, $f$ and $g$. Then if the cord is pulled in the direction of the arrow $h$, so as to rotate the drum and the attached card with it about its center $i$, the scribing points will travel over the surface of the rotating card or plate in paths indicated by the curves $j$, $k$, $l$, $m$ and $n$, all of which are involute curves of the base circle $a$. In like manner, a series of cutting tools 1, 1, 1, shown in Fig. 19, traveling on a line of action o corresponding to the cord b relatively to a rotating gear 2, will generate involute face curves on the teeth 3 of the gear as involutes of a circle 4 having the same linear speed as the tools, (such circle being the base circle of the gear), when the tools travel in either direction, provided the gear rotates in the same direction. If the faces of the tools are perpendicular to the line of action o, the points where such faces intersect the line of action are the cutting points. Such points must necessarily be located at the extremities of edged tools and the tools must be adjusted accordingly, but they may have any location in the plane faces of abrasive tools, provided the periphery of the tool is clear of the root circumference of the gear. The distance between the cutting tools determines the pitch of the gear teeth. The progression of the cutting tools along the line of action at the same speed and in the same direction as the peripheral travel of the base circuit is what I mean by the expression "base line travel" and equivalent expressions, used in this specification.

If the members which I have designated above as cutting tools are joined as elements of a single tool in a continuous helix around an axis parallel to the line of action, and the tool is rotated about such axis, the cutting elements will progress continuously in the same direction relatively to the work while the work rotates continuously in the same direction, each element engaging a following tooth of the work with each rotation of the tool. For convenience of description in this specification, each complete turn or convolution of the helix may be considered as one of the cutting elements.

Figures 11, 12, 13, 14:
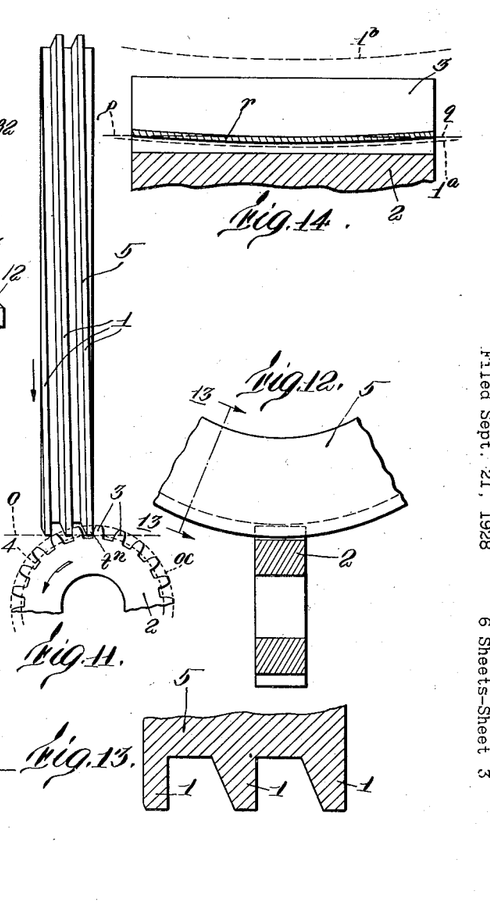
Fig. 11 (Sheet 3) is a plan view of the cutting tool and a fragment of the work piece detached from other parts of the machine.
Fig. 12 is an axial section of the work piece and an elevation of a fragment of the tool.
Fig. 13 is a fragmentary sectional view of the tool taken on line 13—13 of Fig. 12.
Fig. 14 is a fragmentary view on an enlarged scale, partly in section and partly diagrammatic, to illustrate the distribution of cutting effect on the active face of the tool.

I apply the principle thus explained to the machine described in the present specification by employing a circular tool 5, shown in detail in Figs. 11, 12 and 13, the cutting elements 1 of which are the turns of a continuous single helical rib or a number of coextensive helical ribs. In other words, the tool may have a single lead or a multiple lead as to its helical elements. As illustrated here, the helix is single. Also the tool is of an abrasive character, either an emery wheel or a metal lap intended to be supplied with a loose abrasive in the course of its action. The lap is a special form of abrasive cutter useful for removing minute irregularities in the gear tooth faces and giving a finer finish than can be obtained with an emery wheel. As the tool is designed for obtaining highly accurate results and must be capable of taking cuts of greater or less depth or weight, it is constructed to act only on one face of the gear teeth at a time, and to that end the face of the helical rib which so acts is made perpendicular to the axis of the helix. The opposite face may be of any shape which will clear the opposite side of the gear tooth and at the same time give adequate strength to the rib. In other words, the rib is of slightly less thickness than the width of the tooth spaces in the work piece.

Preferably I arrange the tool so that the zone of its contact with the work is inward from the edge of the helical cutting element by locating it with the turns of the helicoidal surface intersecting the line of action, in order to avoid the disintegration which occurs when an abrasive tool is subjected to wear at its edge. As the work pieces always have substantial thickness or length in the axial direction, and the cutting element travels in an arc, such wear and contact is distributed over a zone on the cutting element, the width of which zone is determined by the thickness of the gear and the radius of the element, but the tangent contact between the cutter and work is always in the line of action, or rather, since the gear has substantial length axially, the plane parallel to the axis of the gear including the line of action, which may be called the plane of action. This is made clear by Fig. 14, where 3 represents one of the teeth and 2 represents the body of the work piece, as in Fig. 19, and the broken curved lines 1a and 1b represent the outer and inner circumferences, respectively, of the cutting element. The straight line p, q, represents the intersection of the plane of action with the face of tooth 3. The shaded area r designates the width of the zone on the helicoidal active face of the tool within which the contact of the tool and work takes place and is bounded on one side by the arc which passes through the intersection of the line p, q with the ends of the tooth and, on the other side, by the arc tangent to the line p, q at the middle of the tooth. Actually the contact distribution when the tool cuts is wider than this zone in proportion to the depth of the cut being taken.

Although a helicoidal surface is not a true plane, the departure from such a plane may be reduced to an amount too small to be measured. It has been determined mathematically that in a helix having a normal pitch of .421″ (corresponding to the usual pitch of gears which are used in great numbers in automobile transmissions) and a diameter of 9″, the warp or departure from a straight line in 1″ of peripheral length is only twenty-four ten-millionths of an inch (.0000024″). A diameter of 9″ or more is entirely feasible for the tools used in machines of the character here shown, and is preferable to smaller diameters on account of its rapid linear speed at the cutting surface. Thus it will be seen that the helical twist of the tool has no measurable ill effect on the accuracy of the machine.

In order that the active part of the tool may remain in contact continuously with the same tooth of the gear from the root to the point of the tooth, or vice versa, and in order also to ensure contact of the tool with two or more teeth at the same time when otherwise possible, the rib 1 should make more than a complete convolution, and usually two or more. The exact number depends on the diameters of the work pieces on which the tool is designed to act, being obviously greater for a work piece of large diameter than one of small diameter. Many gears are so designed that the involute curve extends inward all the way to the base circle, and the root circumference is inside of the base circle, the teeth having flanks between the base and root circles which may be radial or spreading, or undercut; and the drawings show such a gear as the work piece. The machine is not limited to operation on such gears alone, but may be adjusted to begin or end its action on any part of the tooth curve; that is, in any of the positions of the tool 1 shown in Fig. 19, or any intermediate position. In any case, however, there should be as many turns of the helical rib as there are teeth of the gear between the intersection of the line of action with the outside circumference of the gear and its intersection with the root circumference, or with the point of tangency with the base circle.

In Fig. 11 the broken line o represents the line of action, as in Fig. 19; the broken circular arc 4 represents the base circle of the work piece and is tangent to the line of action at the point $tn$; the broken arc $oc$ represents the circumference in which the points or outer extremities of the gear teeth lie, and constitutes what I have referred to above as the outside circumference of the gear, and the circular line in which the bottoms of the tooth spaces lie is the root circumference. It will be noted that the line of action in its length between the first and last convolutions of the rib diverges from the base circle 4 at least as much as the radial distance from the base circle to the outside circumference, so that, during the time that any single tooth is in contact with the active face of the tool, the entire face of the tooth from the base circle to the point of the tooth, or vice versa, sweeps across the active face of the tool. In order that the cutting action may extend to the base circle, it is necessary of course that the helicoidal surface at one end of the tool should extend to coincidence with a diameter of the work piece; in other words, it should extend to the tangent point between the line of action and the base circle, and there its radial surface element is radial to the work piece; while its opposite end extends beyond the outside circumference of the work piece. The tool indeed may extend to the other side of the tangent point, but so much of it as does so extend is idle so far as the normal action of finishing involute tooth faces is concerned, and functions only for the special purpose of forming undercut flanks on the teeth within the base circle for special purposes. To perform the desired effect of generating true involute curves, the work piece must be rotated in such relation to the tool that the linear speed of its base circle at the tangent point $tn$ is equal to the displacement of the helicoidal surface of the tool along the line of action $o$ (or, in other words, axially of the tool) and in the same direction as such displacement.

In the following description it will be assumed that the tool shown in connection with the drawings of the machine is an emery wheel provided with a single helix, but in the understanding that a lap or an abrasive wheel of specifically different character is equivalent and may be used in substitution for the emery wheel.

The tool 5 is secured to a head 6 on a spindle 7, (Figs. 4 and 6) mounted in suitable bearings within a housing 8 attached to a tool carriage 9 supported on the machine base or pedestal 10 with provision for adjustment in the directions and to the extent permitted by the slots 11 (Fig. 4) in the brackets 12 of the carriage through which bolts 13 pass to secure the carriage on the base. The work piece 2 is placed on a stem 14 secured to a spindle 15 mounted upright in bearings in the work carriage 16 supported by guides 17 in a forwardly extending part of the base and adjustable in the directions of the slots 18 of the carriage through which the securing bolts 19 pass, also shown in Fig. 4. The axes of the tool and work spindles are transverse to one another, but in different planes. That of the tool spindle may be inclined more or less to conform the helix angle of the cutting elements to the direction of the teeth in the work, and to that end the connection between the tool spindle holder and the carriage 9 consists of a cylinder 20 rotatably mounted in the carriage and to which the housing 8 is secured. Bolts 21 are carried by the flange of the cylinder and extend into annular slots in the carriage. Adjustment of the tool relatively to the axial plane of the work at right angles to the axis of the work is made by a screw 22 mounted in a bearing 23 fixed to the base and engaging a nut 24 secured to the carriage. The graduated hand wheel 25 serves to turn the screw and, in conjunction with an index 26, to measure the movements of the carriage. Likewise the work carriage 16 is adjusted to accommodate work pieces of different diameters by a screw 27 threaded into a nut 28 on the carriage and held in a fixed bearing 29 on the machine base. As shown in Fig. 2, the work is mounted with its medial plane, that is, the plane midway between its ends, radial to the tool. This is a characteristic of the machine ordinarily requiring no adjustment, on account of the uniformity in thickness of great numbers of gears and similar articles, but suitable adjustment may be made by substituting supporting collars 30 of different height beneath the work piece.

The drive for rotating both cutter and work is from a belt pulley 31, or equivalent machine element secured to a quill 32 which rotates on bearings supported by a stud 33 coaxial with the pivot cylinder 20. A gear 34 on the quill drives through an idle gear 35 (Fig. 3), a gear 36 on a shaft 37 (Figs. 4 and 7) carrying a bevel gear 38 in mesh with a complemental bevel gear 39 on the cutter spindle 7.

The drive for the work spindle is from a pinion 41 carried by a stud 42 secured to the quill 31, through change gears 43 and 44 to a gear 45 on a shaft 46, a helical gear 47 also on shaft 46 (Fig. 5), a helical gear 48 meshing with gear 47 and secured on a shaft 49 rotatably mounted in the carriage 16 parallel to the work spindle, a pinion 50 on shaft 49, and a gear 51 on the work spindle meshing with the pinion 50. Thus the work is rotated in harmony with the travel of the cutting tool helix, and the changeable gear train 41—45 enables the travel of the work to be adjusted to that of the tool and altered for work of different diameters.

Adjustment of the work rotatably to regulate the cutting feed, or depth of cut, may be effected by shifting the helical gear 47 endwise. This may be done by the means shown in Fig. 5. Shaft 46 passes into a chamber or housing 52 fast to the work carriage, in which are bearings 53 and 54 for the sleeve or hub of the gear 47. Bearing 54 abuts on a quill 55 which is slidable endwise in the housing 52 and is pressed upon by a stiff spring 56 reacting against a shoulder 57 in the end of the housing. A slide 58 abuts on the bearing 53 and in turn is pressed upon by a screw 59 threaded through a nut 60 secured to the end of housing 52. The screw carries a graduated collar 61 which, in conjunction with an index 62, measures the adjustments thus given. Preferably contact between screw 59 and slide 58 is made by hardened wear pieces 63 and 64. As the gears 47 and 48 have helical teeth, endwise movement of the former necessarily gives rotation to the latter.

Figure 5:
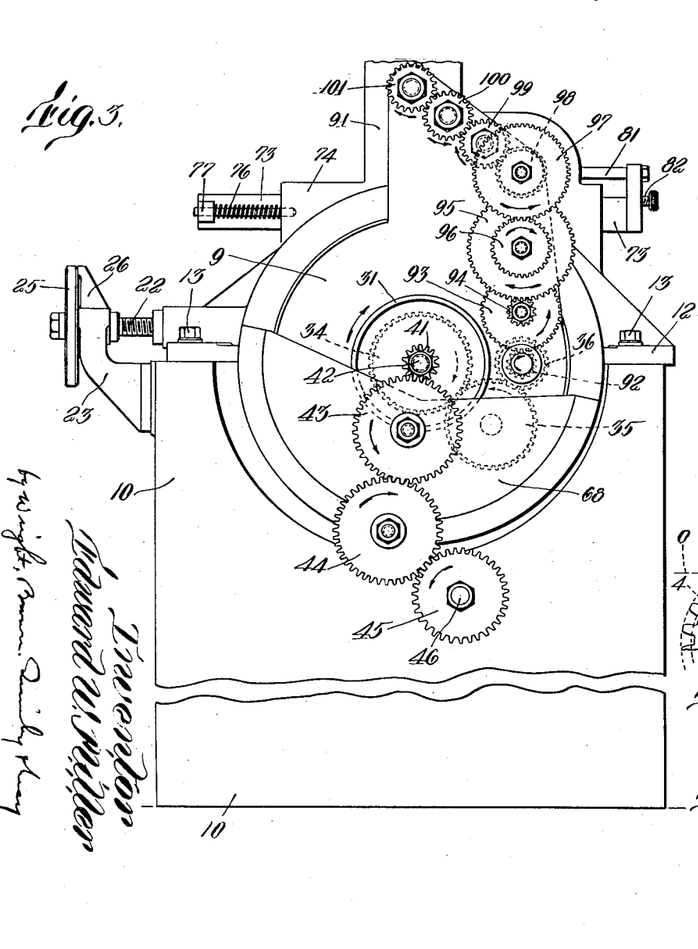
Fig. 5 is a horizontal section, on a larger scale, taken on line 5—5 of Fig. 2.

In order to permit the endwise movement of gear 47 last described relatively to its driving shaft 46, and also to permit adjustment of the work carriage bodily, gear 47 is provided with a long hub or sleeve portion adapted to slide on the shaft 46 and is splined to the shaft.

Shaft 46 turns in a bearing holder 65 fast to the machine base 10 and the gears 43 and 44 are mounted on studs 66 and 67 carried by a frame 68 fastened to the cutter carriage 9. This frame is adjustable angularly about the axis of stud 33, being held as adjusted by means of bolts 69 which occupy a groove in the end of the carriage concentric with stud 33 so that gear 44 may be placed in correct mesh with gear 45 in any position of adjustment of the carriage. The angular adjustment of the tool, being made about the axis of stud 33 and pinion 41, causes no disturbance and requires no adjustment of the gear train 41—45.

The machine includes also a means for truing the helicoidal face of the cutting tool and adjusting its pitch so as to generate curves of correct pressure angle in the work. Such means is a diamond 70, or equivalent cutter adapted to trim the face of the tool, carried by a holder 71 mounted in a transverse guideway 72 in a longitudinally movable slide 73. The latter occupies guides 74 and 75 carried by the cylindrical part 20 of the tool holder so that, however the latter is adjusted angularly, the slide always remains in the same relationship to the tool. It extends and moves parallel to the axis of the tool, and is rectangular or otherwise non-circular in cross section so that it will not turn in its guides, and the guideway 72 for the diamond holder 71 is perpendicular to the axis of the tool.

Figures 6, 7, 8:
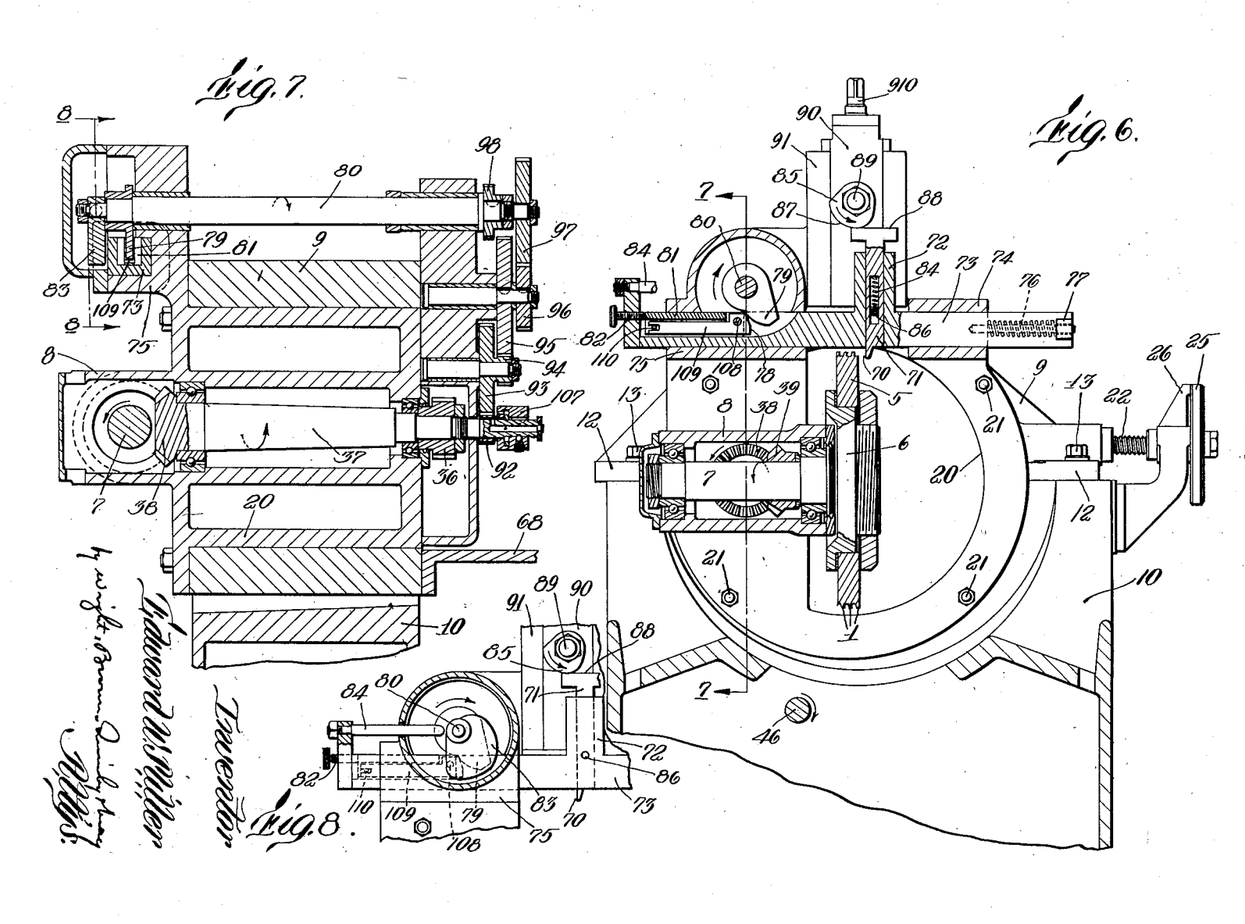
Fig. 6 is a vertical cross section taken on line 6—6 of Fig. 2.
Fig. 7 is a fragmentary section of the machine taken on line 7—7 of Fig. 6.
Fig. 8 is a detail cross section taken on line 8—8 of Fig. 7.

Slide 73 is always urged to the right, with respect to Figs. 1 and 6, by springs 76 which react between the end of the guide 74 and lugs 77 on the slide. By this means an abutment 78 carried by the slide is maintained in position to coact with a cam 79 carried by a shaft 80 which is journaled in a bearing on a part of the angularly adjustable tool carrier or cylinder 20. Cam 79 has an active face which is an involute curve developed from a base circle coaxial with shaft 80, and the face of the abutment 78 which contacts therewith corresponds to the face of a conjugate rack tooth, whereby rotation of the cam causes the slide to travel with uniform motion and at a rate equal to the lead of the helicoidal face of the tool. Abutment 78 is adjustable endwise so as to bring the diamond into action on the wheel at a desired point in the travel of the slide, and to that end is carried by a holder 81, as shown in Fig. 6, and better shown in Figs. 9 and 10, which occupies a channel in the slide 73 and abuts against an adjusting screw 82.

Cam 79 rotates completely and continuously while the truing mechanism is in action, and in order to retard the return of the slide after the cam leaves the abutment and bring it to rest without shock, I provide a second cam 83 on shaft 80 (see Figs. 7 and 8) which engages a rod 84, or equivalent abutment, carried by the slide, after the cam 79 has passed abutment 78. Cam 83 has a gradually receding face which eases the slide back to starting position before the cam 79 comes around to engage the abutment 78 again.

It is intended that the truing action on the helical tooth face be carried out in a series of steps, the diamond in each step cutting away a narrow zone of the surface and being given an increment of feed after each step. In order that the diamond may clear the grinding wheel on its return travel and be brought again into cutting position, I have mounted the holder 71 for movement endwise in the guide 72, as previously described, and provided a spring 84 to withdraw it from the wheel and a cam 85 to return it into operative position. The spring 84 is confined in a longitudinal slot in the diamond holder, as shown in Figs. 2 and 6, and bears on a pin or bar 86 which crosses the slot and is set at its ends in the opposite walls of guide 72. The cam 85 has a high dwell 87, and the diamond holder a transverse contact surface 88, the combined extent of which is enough to hold the diamond in cutting position throughout its operative traverse along the face of the wheel. Cam 85 is secured to a shaft 89 carried by a slide 90 which occupies a guide 91 carried by the cutting wheel holder 20 and extending transversely of the wheel axis. Slide 90 is equipped with an adjusting screw 910 by which the feeding increments are given to the diamond. As here shown, the adjusting screw is arranged for manual operation, but I contemplate providing an automatic means for operating it.

The drive for the cams 79, 83 and 85 is taken from a pinion 92 on shaft 37 through a gear train 93, 94, 95 and 96, to a gear 97 on shaft 80, and from a gear 98 on the latter shaft through a gear train 99 and 100 to a gear 101 on a shaft section 102 which is connected with shaft 89 through universal joint 103, extensible shaft section 104 and universal joint 105, or equivalent flexible shaft. The entire driving train from pinion 92 to and including shaft section 102 is carried by a frame structure 106 secured to the angularly adjustable tool holder 20 for adjustment therewith. Pinion 92 is loose on shaft 37, but is coupled therewith by a clutch 107 to put the truing mechanism in operation.

Figures 4, 15, 16, 17:
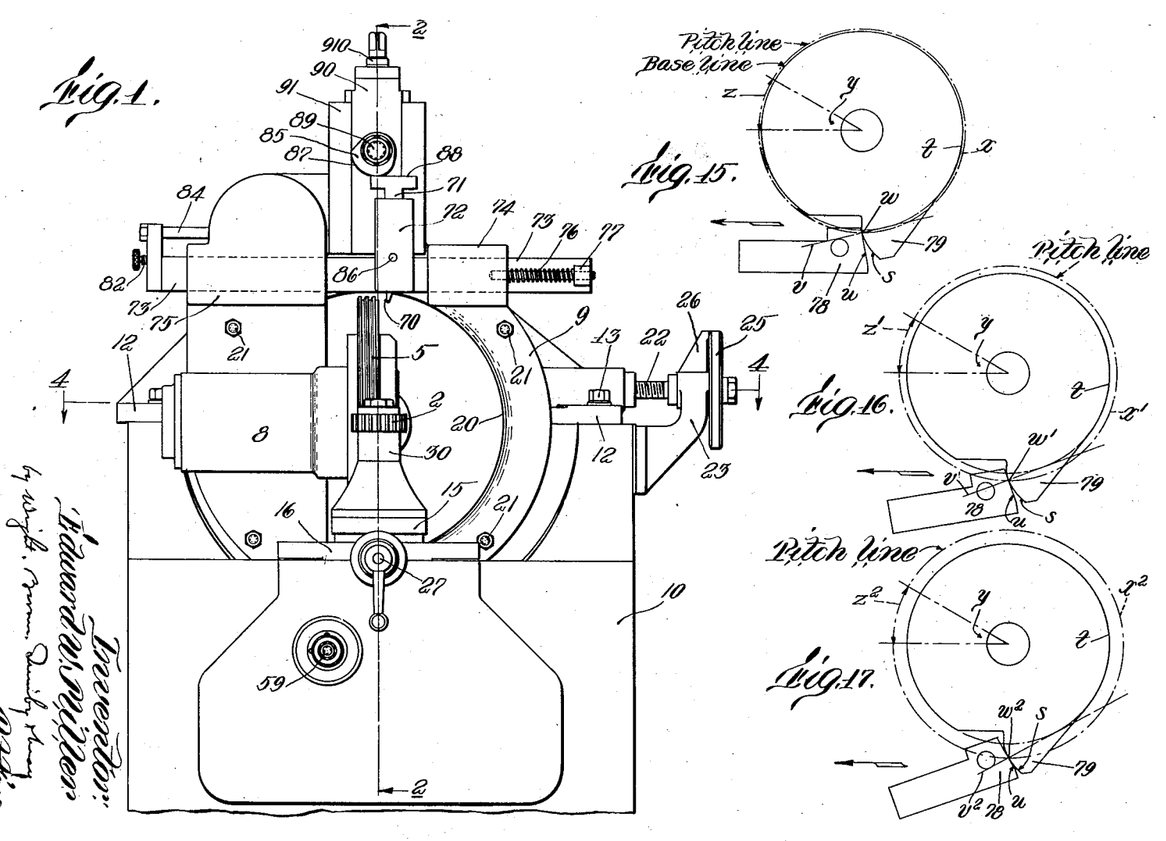
Fig. 4 is a plan and horizontal section taken on line 4—4 of Fig. 1.
Figs. 15, 16 and 17 (Sheet 1) are diagrammatic views illustrating the principles and effect of the adjusting means by which the cutting tool is caused to correct the pressure angle of the tooth forms generated in the work.
Figures 4, 9, 10:
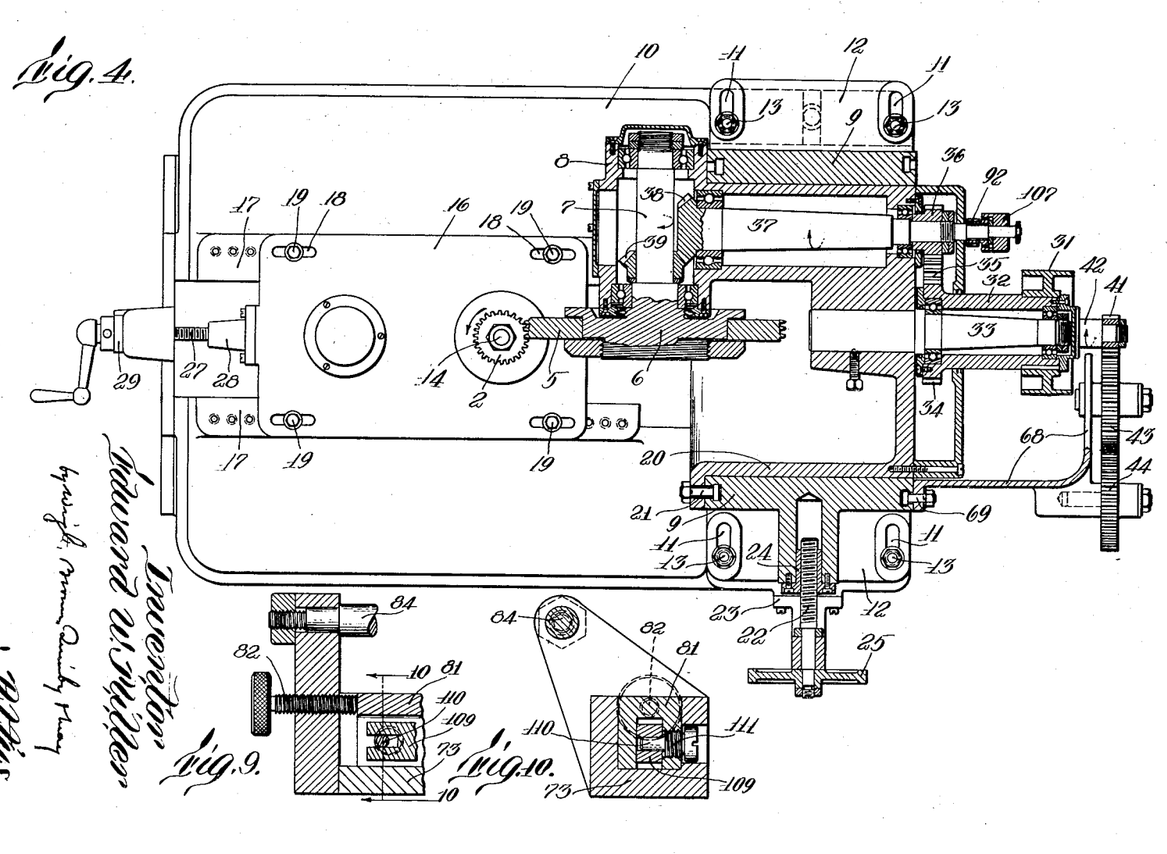
Fig. 9 (Sheet 4) is a sectional view on a larger scale of the detail shown in Fig. 6.
Fig. 10 is a cross section on line 10—10 of Fig. 9.

The said truing mechanism is not merely a means for trimming or dressing the cutting tool, but it has the further function of correcting the helical lead of the tool to give the correct pressure angle to the tooth form being generated. This is accomplished by adjusting the abutment 78. The latter, as shown in Figs. 6, 9 and 10, is connected by a pivot 108 with the holder 81 and is provided with an adjusting arm 109 having a slot or notch in which is located an eccentric pin 110 on a screw 111 fitted in the side of the holder 81. By the angular movement thus given to the face of the abutment, the rate of movement of the diamond carrying slide 73 is altered independently of the rate of rotation of the cutting tool. The effects obtained by this adjustment follow from the properties of involute curves, and their principles are illustrated diagrammatically in Figs. 15, 16 and 17. In all of these figures the curve $s$ (which represents the active face of cam 79) is an involute curve of the same base circle $t$, and $u$ is the contacting face of the abutment, corresponding to the face of a rack tooth conjugate to the involute curve. In Fig. 15 the face $u$ is at an angle of 10° with the perpendicular to the direction in which the slide is constrained to travel. A line $v$ tangent to the base circle and perpendicular to the face $u$, passes through the pitch point $w$, thus determining the pitch circle $x$ on which the rack face $u$ and involute $s$ cooperate. If the face $u$ were perpendicular to the line of travel, the pitch circle would coincide with the base circle. In Fig. 16 the rack face is set at an angle of 20°, and the line $v'$ then similarly establishes the pitch point $w'$ and pitch circle $x'$; while in Fig. 17 the rack face is at an angle of 30° and the tangent perpendicular $v^2$ establishes a different pitch point $w^2$ and a still larger pitch circle $x^2$. It is thus apparent that increasing inclination of the abutment face increases the effective pitch diameter of the cam 79 and therefore increases the length of movement given to the slide with the same angular movement of the cam, since the same angle y subtends respectively longer arcs z, z', and z² on the several pitch circles. Although the range of adjustment of this character permitted to the abutment 78, as shown in Fig. 6, is much less than that shown in the explanatory diagrams, it is sufficient to correct such minute errors as exist in gears shaped with the approximation to perfection permitted by the existing gear making methods; while it is evidently perfectly feasible to provide for a wider angular adjustment than is here provided. But my aim has been in the direction rather of providing for a small adjustment through minute but determinable amounts, by providing the abutment with a long adjusting arm 109 and moving it by a slightly eccentric pin in order that the small errors left in gear teeth when made by the best cutting methods may be accurately removed by the finishing process of this machine. This adjustment is best obtained by the cut and try method. That is, if, after one cut has been made on a tooth of the work, the pressure angle is not exactly right, measurement of the gear will show this fact and the necessary adjustment to correct the error will then be made. The effect on the work of thus adjusting the pitch of the cutting helix is the same as though the cutting tool were adjusted to travel at an equal speed with a different base circle of the work, thus generating the involute to a different base circle and consequently with a different pressure angle.

The procedure of finishing a gear or gear shaping cutter, etc. by the use of this machine will be apparent from the foregoing description without further explanation. It will be noted that the machine has flexibility for making all adjustments necessary to accommodate a variety of different gears within the limits of its capacity, and that results of extreme accuracy are obtainable. The character of the abrading tool and the means for truing it are such as permit the elimination of all errors great enough to be measured.

What I claim and desire to secure by Letters Patent is:

1. In a machine of the character described, for truing an abrading tool having a helicoidal active surface and means for rotating said tool, a truing tool therefor, a carrier for said truing tool arranged to move in a path transverse to the said helicoidal surface, and means for so moving said carrier at a uniform rate comprising a cam rotatable about an axis transverse to said path and having an active face which is an involute curve, and an abutment on the carrier coacting with said cam face.

2. In a machine of the character described, for truing an abrading tool having a helicoidal active surface and means for rotating said tool, a truing tool therefor, a carrier for said truing tool arranged to move in a path transverse to the said helicoidal surface, and means for so moving said carrier at a uniform rate comprising a cam rotatable about an axis transverse to said path and having an active face which is an involute curve of a base circle concentric with said axis, and an abutment on the carrier having a face corresponding to that of a rack tooth conjugate to the involute cam surface.

3. In a machine of the character described, for truing a cutting tool having a helicoidal abrading face and means for rotating it about the axis of said face, a tool for truing and adjusting said face, a carrier for the tool arranged to travel in a path transverse to the helicoidal face, and means for propelling said carrier and adjusting its rate of travel comprising a cam having an involute active face and an angularly adjustable abutment mounted on the carrier having a face cooperative with the cam face and related thereto in the manner of a rack tooth to a gear tooth, the adjustment of the abutment causing its face to be inclined more or less to the direction in which the carrier travels.

4. A machine for truing an abrasive helicoid, comprising means for rotating such helicoid about its axis, a truing tool carrier movable longitudinally of such axis, a truing tool mounted in said carrier with provision for movement relatively thereto transverse to said axis, a driving cam having intermittent engagement with said carrier for moving it in one direction, a spring for moving said carrier in the opposite direction when released by said cam, a spring acting on said truing tool tending to withdraw it from the circumference of the abrasive helicoid, and a cam arranged to hold said tool in a position to act on the helicoid during the cam-effected traverse of the carrier, and to permit the second named spring to hold the tool withdrawn during the spring-effected return traverse of the carrier.

5. A machine for truing an abrasive helicoid, comprising means for rotating such helicoid about its axis, a truing tool carrier movable longitudinally of such axis in opposite directions in the same path, a truing tool mounted in said carrier with provision for independent movement relatively thereto transverse to said path, means for traversing the carrier back and forth in its prescribed path of movement, and means for moving the truing tool in and out with respect to the helicoid; said respective means being timed and organized to effect contact of the truing tool with the helicoid during traverse of the carrier in one direction and to maintain the truing tool clear of the helicoid during traverse of the carrier in the opposite direction.

6. A machine for truing an abrasive helicoid, comprising means for rotating such helicoid about its axis, a truing tool carrier movable longitudinally of such axis, a truing tool mounted in said carrier with provision for movement relatively thereto transverse to said axis, a rotatable cam constructed to engage said carrier during part of its rotation only for moving the carrier in one direction, a spring acting on the carrier for moving it in the opposite direction, a second cam organized to engage the carrier during the spring-effected movement of the latter for controlling the speed of such movement, and means for shifting the truing tool relatively to said carrier in timed relation with the movements of the latter organized to hold the tool in contact with the helicoid during the cam-effected movement of the carrier and to maintain it displaced from the helicoid during the spring-effected movement of the carrier.

7. A machine for truing an abrasive helicoid, comprising means for rotating such helicoid about its axis, a truing tool carrier movable longitudinally of such axis, a truing tool mounted in said carrier with provision for movement relatively thereto transverse to said axis, means for reciprocating said carrier between limits such that the truing tool is carried back and forth from one end of the helicoid to the other, a spring acting on the truing tool with tendency to withdraw it from the helicoid, and a cam for shifting the truing tool into position to engage the helicoid; said truing tool having a cam follower portion including a surface parallel to the path of movement of said carrier bearing against the cam and of an extent as great as the traversing movement of the carrier.

8. An apparatus for truing an abrasive helicoid comprising means for rotating such helicoid about its axis, a truing tool carrier movable in the axial direction of such helicoid, means for moving said carrier back and forth through a distance as great as the axial extent of the surface to be trued, a truing tool and a holder therefor mounted movably in a guideway of said carrier which extends transversely to the path of movement thereof, said truing tool being placeable in a position for engaging the helicoid, and displaceable clear of the latter, said holder having a cam contact surface parallel with the path of travel of the carrier, and a cam having a face with which said contact surface engages and over which it is adapted to slide, said cam being constructed and operated to effect the aforesaid placement and displacement of the truing tool with movements of the carrier respectively in opposite directions.

9. A truing apparatus as set forth in claim 8, and comprising further a slide carrying said cam and adjustable toward and away from the axis of the helicoid.

EDWARD W. MILLER.